United States Patent
Xiong et al.

(10) Patent No.: US 10,039,159 B1
(45) Date of Patent: Jul. 31, 2018

(54) AC LED DRIVER WITH CAPACITIVE SWITCHING

(71) Applicant: Universal Lighting Technologies, Inc., Madison, AL (US)

(72) Inventors: Wei Xiong, Madison, AL (US); Christopher Radzinski, Huntsville, AL (US)

(73) Assignee: Universal Lighting Technologies, Madison, AL (US)

( * ) Notice: Subject to any disclaimer, the term of this patent is extended or adjusted under 35 U.S.C. 154(b) by 0 days.

(21) Appl. No.: 15/696,308

(22) Filed: Sep. 6, 2017

Related U.S. Application Data

(60) Provisional application No. 62/383,824, filed on Sep. 6, 2016.

(51) Int. Cl.
*H05B 33/08* (2006.01)

(52) U.S. Cl.
CPC ..... *H05B 33/0809* (2013.01); *H05B 33/0845* (2013.01)

(58) Field of Classification Search
CPC ............ H05B 33/0815; H05B 33/0818; H05B 33/0884; H05B 33/0809; H05B 33/0848; H05B 33/0896; H05B 33/0845; H05B 33/0803; H05B 37/0272; H05B 33/0857; H05B 33/0887
USPC .............................. 315/185 R, 294, 224, 307
See application file for complete search history.

(56) References Cited

U.S. PATENT DOCUMENTS

| | | | | |
|---|---|---|---|---|
| 2009/0027016 A1* | 1/2009 | Mayer | ................... | H05B 41/46 323/268 |
| 2009/0161398 A1* | 6/2009 | Benaboud | ........... | H02M 5/4585 363/131 |
| 2014/0159599 A1* | 6/2014 | Tetik | ................... | H05B 33/0827 315/193 |
| 2015/0349538 A1* | 12/2015 | Agostinelli | ............. | H02J 50/12 307/104 |
| 2016/0016479 A1* | 1/2016 | Khaligh | .............. | B60L 11/1812 363/17 |
| 2016/0174315 A1* | 6/2016 | Chang | ................ | H05B 33/0824 315/191 |
| 2017/0373499 A1* | 12/2017 | Stewart | ................... | H02M 5/04 |

* cited by examiner

*Primary Examiner* — Thai Pham
*Assistant Examiner* — Syed M Kaiser
(74) *Attorney, Agent, or Firm* — Patterson Intellectual Property Law, P.C.; Gary L. Montle

(57) ABSTRACT

An AC LED driver for providing operating power to an LED load. The AC LED driver includes a first input terminal and a second input terminal, each of the first and second input terminals connectable to an AC input voltage source. The AC LED driver further includes a current limiting capacitor coupled to the first input terminal and a bridge rectifier coupled to the current limiting capacitor, the bridge rectifier having a plurality of rectifying diodes. The AC LED driver also includes a phase angle shift unit coupled to the first input terminal and the bridge rectifier, the phase angle shift unit configured to minimize a phase angle between input line current and input voltage received via at least one of the first input terminal and the second input terminal.

20 Claims, 4 Drawing Sheets

AC LED DRIVER WITH CAPACITIVE SWITCHING

CROSS-REFERENCES TO RELATED APPLICATIONS

This application claims priority to and benefit of U.S. Provisional Patent Application No. 62/383,824, dated Sep. 6, 2016, entitled "AC LED Drive with Capacitive Switching," and which is hereby incorporated by reference in its entirety.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to improved low-cost alternating current (AC) light emitting diode (LED) drivers. More particularly, the present invention relates to apparatuses, systems, and methods for providing an AC LED driver with capacitive switching.

LED lighting is growing in popularity due to decreasing costs and long life compared to incandescent lighting and fluorescent lighting. LED lighting can also be dimmed without impairing the useful life of the LED light source.

Typically, an LED driver is a switching power supply, which means that a DC-DC converter must be used to regulate the LED load current. But the cost of switching power supply type LED driver is high, so it's desirable to minimize LED driver cost as much as possible. For this reason, directly-driven AC line LED drivers have emerged.

AC LED drivers have numerous advantages relating to the freedom from using DC-DC power converter technology and the extremely low cost. The AC LED driver simply drives the LEDs with AC input line power supply. However, most of AC LED drivers have complicated current control requirements and can't effectively solve the turn-on inrush current problem, which dramatically affects an LED's lifespan. As such, a low cost AC LED driver with inherent current limiting capability and with simple control is very desirable to maintain LED lamp competitiveness.

An LED driver with a capacitor limiting output current is very simple and cost effective for low current (e.g., 10 mA-150 mA) type LED applications. For example, FIG. 1 illustrates a system 100 having a simple LED driver 110 with only a capacitor to control the LED load current for a load 120. The LED driver 110 of system 100 has only a current limiting capacitor, C_I_limit, a bridge rectifier BR comprised of rectifying diodes D1-D4, and an output capacitor C_out. If the impedance of the current limiting capacitor C_I_limit is much greater than the load impedance, the LED load current can be set by C_I_limit as:

$$I\_LED = \frac{2 \times \sqrt{2}}{\pi} \times \frac{V\_in\_ac}{\frac{1}{2 \times \pi \times f_{line} \times C_{I\_limit}}} \quad \text{Equation 1}$$

One major drawback of this solution is that the power factor is almost 0 since the capacitor impedance dominates the load. As a result, the input current will always be leading the input voltage by 90 degrees.

BRIEF SUMMARY OF THE INVENTION

It is desirable to provide an alternating current (AC) light emitting diode (LED) driver having an improved power factor.

One object of the systems and methods disclosed herein is to provide an alternating current (AC) light emitting diode (LED) driver for providing operating power to an LED load. The AC LED driver includes a first input terminal and a second input terminal, each of the first and second input terminals connectable to an AC input voltage source. The AC LED driver further includes a current limiting capacitor coupled to the first input terminal and a bridge rectifier coupled to the current limiting capacitor, the bridge rectifier having a plurality of rectifying diodes. The AC LED driver also includes a phase angle shift unit coupled to the first input terminal and the bridge rectifier, the phase angle shift unit configured to minimize a phase angle between input line current and input voltage received via at least one of the first input terminal and the second input terminal.

The phase angle shift unit may include a first switch and a second switch, each of the first switch and the second switch placed in series with at least one of the plurality of rectifying diodes. The first switch and the second switch may be configured to operate such that only positive current flows from the AC input voltage source during a positive line cycle and that only negative current flows from the AC input voltage source during a negative line cycle.

The first switch and the second switch may be configured to minimize a phase angle difference between an input line current and an input line voltage received from the AC input voltage source.

A peak LED load current may be controlled by a conducting time of at least one of the first switch and the second switch. The conducting time may be determined, at least in part, according to a resistance value associated with at least one of (i) a first timing resistor coupled across a gate and a source of the first switch, and (ii) a second timing resistor coupled across a gate and a source of the second switch.

The first timing resistor may be coupled in parallel with a first Zener diode across the gate and the source of the first switch, and the second timing resistor may be coupled in parallel with a second Zener diode across the gate and the source of the second switch.

The AC LED driver may include a first gate charging resistor and a second gate charging resistor, each of the first and second gate charging resistors coupled to the first input terminal. The first gate charging resistor may be coupled to an anode of the first Zener diode, and the second gate charging resistor may be coupled to a cathode of the second Zener diode.

The AC LED may further include a current bypass capacitor coupled to an output terminal of the current limiting capacitor and to the second input terminal. The AC LED may also include a buffer capacitor having first and second output terminals, the buffer capacitor configured to buffer output to a load coupled to the first and second output terminals. The load supplied by the AC LED driver may be an LED light string coupled thereto.

Another object of the systems and methods disclosed herein is to provide a method of providing an alternating current (AC) light emitting diode (LED) driver having improved power function. The method begins by receiving an AC input voltage and current from an AC input voltage source. The received AC input current is then limited using a current limiting capacitor. The limited received AC input current is then rectified to form a rectified input. The rectified input is provided to a phase angle shift unit. A phase angle of at least one of an input voltage and an input current of the rectified input is then shifted using a first switch and a second switch to form a shifted load output. The shifted load output is then provided to a load coupled to the AC LED driver.

The shifting the phase angle may include controlling the first switch and the second switch to operate such that only positive current flows from the AC input voltage source during a positive line cycle and only negative current flows from the AC input voltage source during a negative line cycle.

The method may further include controlling a peak load current according to a conducting time of at least one of the first switch and the second switch.

The method may also include determining the conducting time, at least in part, according to a resistance value associated with at least one of (i) a first timing resistor coupled across a gate and a source of the first switch, and (ii) a second timing resistor coupled across a gate and a source of the second switch.

A further object of the systems and methods disclosed herein is to provide an alternating current (AC) light emitting diode (LED) driver for providing operating power to an LED load. The AC LED includes a first input terminal and a second input terminal, each of the first and second input terminals connectable to an AC input voltage source. The AC LED further includes a current limiting capacitor coupled to the first input terminal, a bridge rectifier coupled to the current limiting capacitor, the bridge rectifier having a plurality of rectifying diodes, a first gate charging resistor and a second gate charging resistor, each of the first and second gate charging resistors coupled to the first input terminal. The AC LED also includes a first switch coupled to an anode of a first of the plurality of rectifying diodes at a drain thereof, a second switch coupled to a cathode of a second of the plurality of rectifying diodes at a drain thereof, a first Zener diode having an anode coupled to the first gate charging resistor and being coupled between a gate and a source of the first switch, and a second Zener diode having a cathode coupled to the second gate charging resistor and being coupled between a gate and a source of the second switch. The AC LED also includes a first timing resistor coupled in parallel with the first Zener diode across the gate and the source of the first switch, and a second timing resistor coupled in parallel with the second Zener diode across the gate and the source of the second switch.

The first and second timing resistors may be respectively configured to set a conducting time and to discharge a gate to source parasitic capacitance of the first switch and the second switch. The first switch and the second switch may be configured to minimize a phase angle difference between an input line current and an input line voltage received from the AC input voltage source.

A peak LED load current may be controlled by a conducting time of at least one of the first switch and the second switch. The conducting time may be determined, at least in part, according to a resistance value associated with at least one of (i) a first timing resistor coupled across the gate and the source of the first switch, and (ii) a second timing resistor coupled across the gate and the source of the second switch.

Numerous other objects, features, and advantages of the present invention will be readily apparent to those skilled in the art upon a reading of the following disclosure when taken in conjunction with the accompanying drawings.

DETAILED DESCRIPTION OF THE INVENTION

Figure 1:
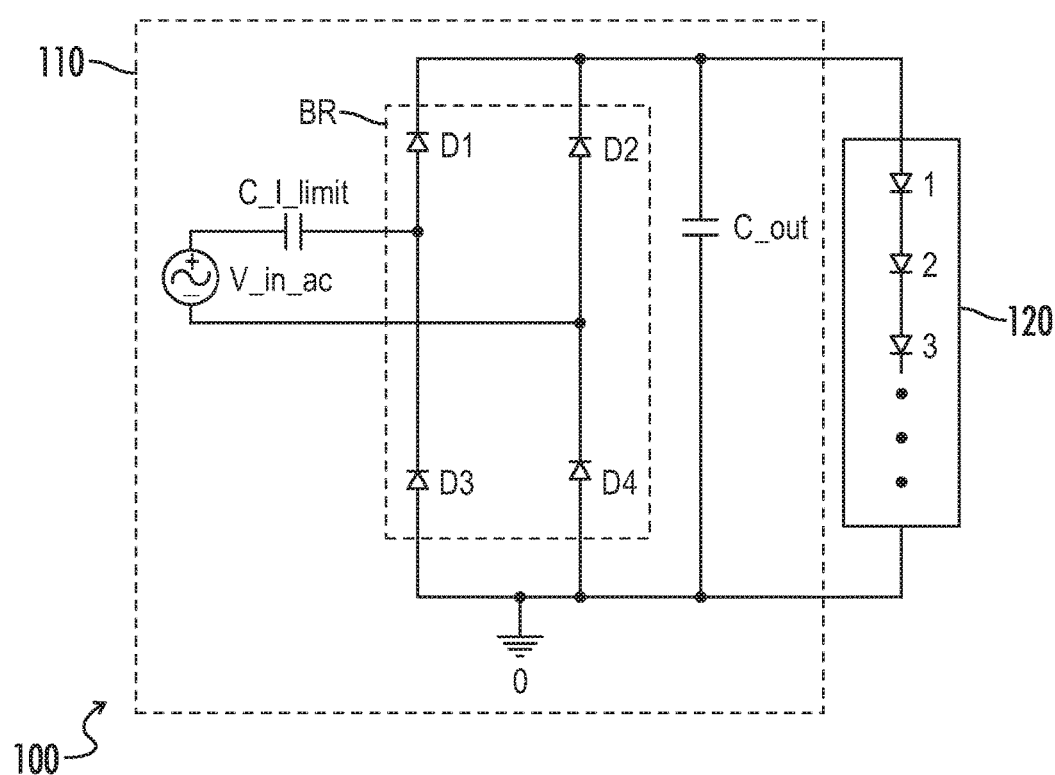
FIG. 1 illustrates a system having a simple LED driver with only a capacitor to control the LED load current.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

Referring generally to FIGS. 1-4, exemplary systems, methods, and apparatuses are now illustrated in greater detail. Where the various figures may describe embodiments sharing various common elements and features with other embodiments, similar elements and features are given the same reference numerals and redundant description thereof may be omitted below.

The present disclosure generally relates to providing an alternating current (AC) light emitting diode (LED) driver having an improved power factor. A power factor (PF) is defined by the equation:

$$PF = \frac{I_{1,rms}}{I_{rms}} \times \cos\phi \qquad \text{Equation 2}$$

$I_{1,rms}$ in Equation 2 is the RMS value of fundamental harmonic of the input current, $I_{rms}$ is the RMS value of total input current, and Ø is the phase angle difference between input current and input voltage.

Thus, we know that if Ø=90 degrees, then PF=0. So, if we could set Ø=0 cos(Ø)=1 we can dramatically improve the power factor of this simple circuit. One way to set Ø=0 is to force the positive input current to be conducted only in a positive input voltage cycle, and to force negative input current to be conducted only in a negative input voltage cycle. Then line current has the same zero cross time as line voltage when line current starts to show up.

Figure 2:
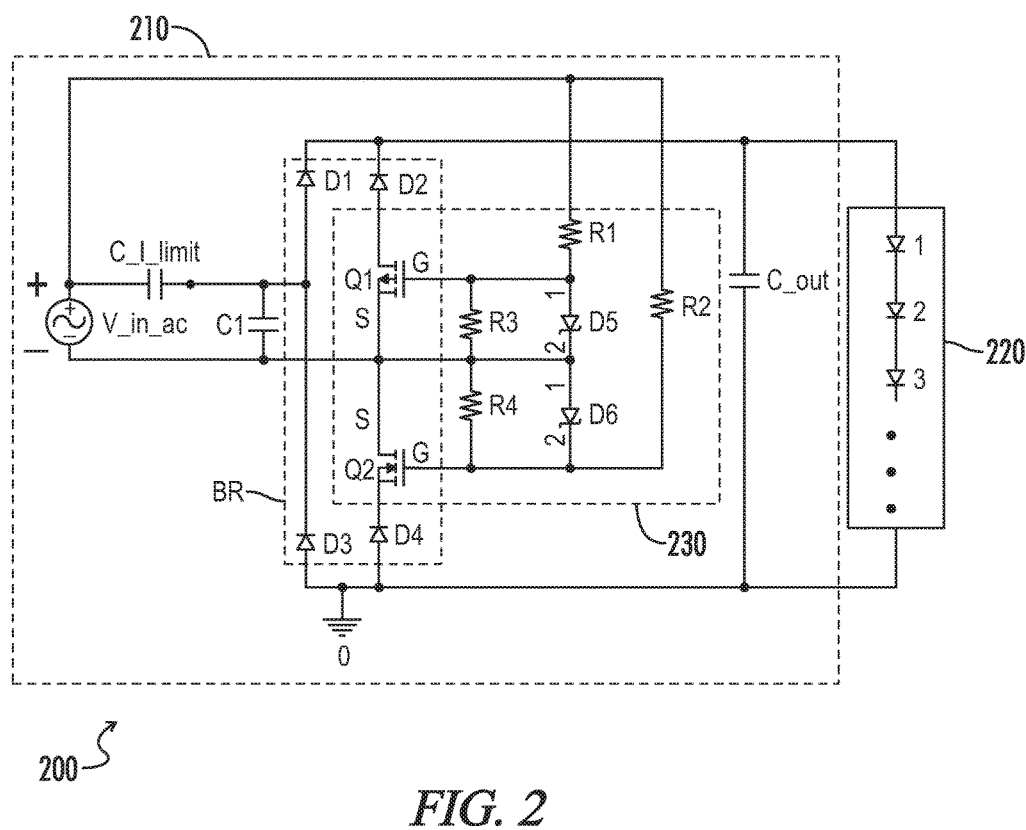
FIG. 2 illustrates an exemplary embodiment of an AC LED driver with improved power factor in accordance with aspects of the present disclosure.

FIG. 2 illustrates an exemplary embodiment of a system 200 including an AC LED driver with improved power factor coupled to a load 220, in accordance with aspects of the present disclosure. In FIG. 2, the voltage V_in_ac is the input AC voltage source. The input AC voltage source may be coupled to the LED driver by one or more input terminals. C_I_limit is a current limiting capacitor coupled to the input AC voltage source V_in_ac. A current bypass capacitor C1 is coupled between terminals of the input AC voltage source V_in_ac. A bridge rectifier BR includes rectifying diodes D1, D2, D3 and D4.

Switch Q1 is a P-channel MOSFET connected in series with the rectifying diode D2 of the bridge rectifier BR. Switch Q2 is a N-Channel MOSFET connected in series with rectifying diode D4 of the bridge rectifier BR. Diodes D5 and D6 are Zener diodes coupled between the gate and the source of the switches Q1 and Q2 to protect the MOSFET gate to source channel. Resistors R1 and R2 function as gate charging resistors for the switches Q1 and Q2. Resistors R3 and R4 are resistors that can be used to set the conducting time and to discharge the gate to source parasitic capacitors of the switches Q1 and Q2. The phase shift unit 230 may include one or more of the switches Q1 and Q2, the diodes D5 and D6, and the resistors R1, R2, R3, and R4. Buffer capacitor C_out is used to buffer output to the load 220 (e.g., an LED string in one exemplary embodiment, although any load may be used).

Figure 3:
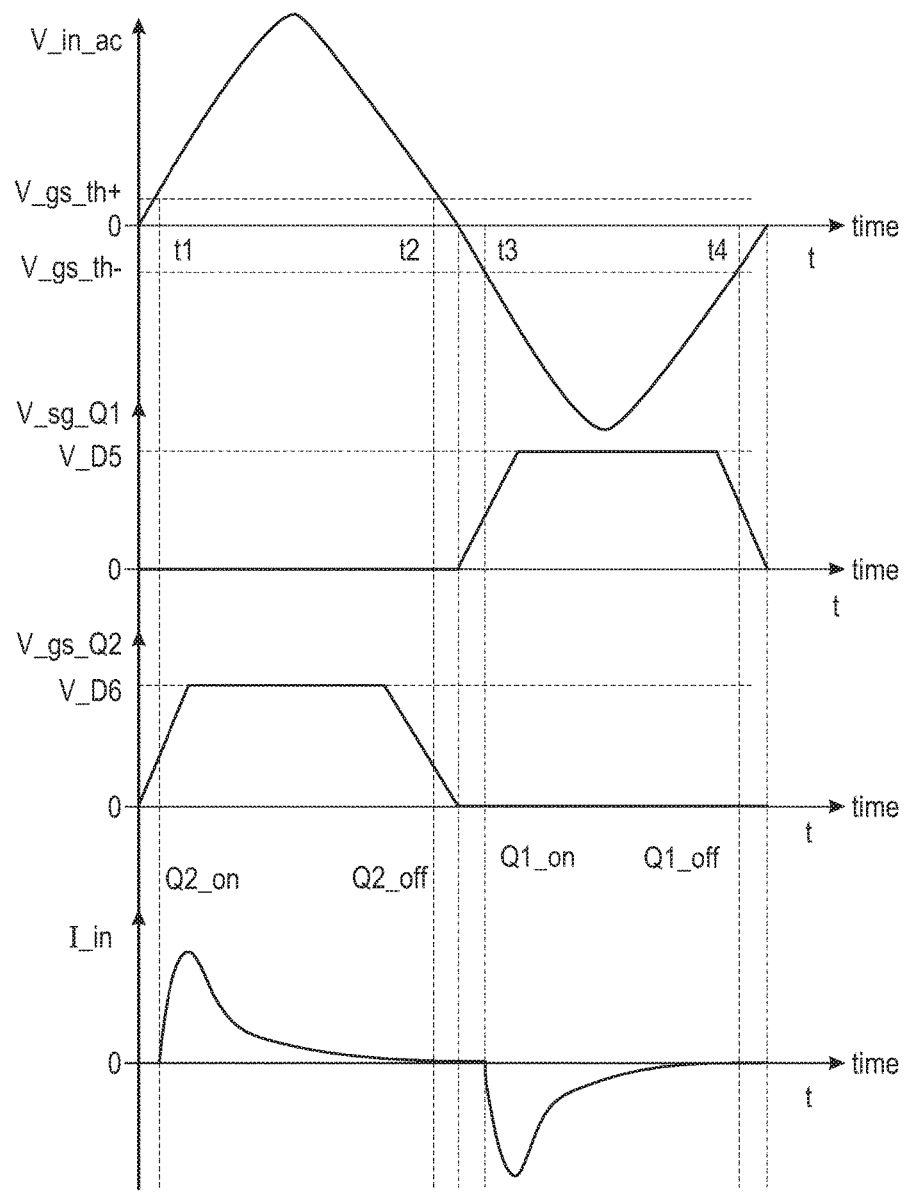
FIG. 3 illustrates an exemplary embodiment of gate drive signal of the two switches and the line current with respect to the input line voltage, in accordance with aspects of the present disclosure.

When the resistance values of R3 and R4 are infinite, the gate driver signal and the line current with respect to the input line cycle is shown in FIG. 3. FIG. 3 illustrates an exemplary embodiment of gate drive signal of the switches Q1 and Q2 and the line current with respect to the input line voltage, in accordance with aspects of the present invention. As shown by FIG. 3, during the positive cycle at time t1, the line voltage V_in_ac reaches the turn-on threshold voltage V_gs_th+ of the switch Q2. The gate to source will be also charged up to the voltage V_gs_th+ at time t1 and the switch Q2 will start to conduct current. In contrast, the gate to source voltage of the switch Q1 remains 0 because the Zener diode D5 is positively conducting. At time t2, the input voltage decreases to the gate to source threshold voltage V_gs_th+ and the gate to source voltage of the switch Q2 also decreases to the voltage V_gs_th−. After time t2, the switch Q2 stops conducting. Thus, between times t1 and t2, the only path for input current is via the rectifying diodes D1 and D4 of the bridge rectifier BR and the switch Q2, which means only positive current can flow when input line voltage is positive. After time t2, the switch Q2 is off and thus no positive current can flow out of the AC input voltage source V_in_ac anymore.

The same conducting sequence may happen for the switch Q1 during a negative line cycle. At time t3, the line voltage reaches the threshold voltage V_gs_th−, which is the conduction threshold voltage of the switch Q1. Since switch Q1 is P-channel MOSFET, the gate to source voltage V_gs must be negative to turn on the switch Q1. Thus, after time t3, the switch Q1 starts to conduct current and the switch Q1 stops conducting at time t4. Between t3 and t4, only Q1, D2 and D3 can conduct current, which means that only negative current can be flowing out during t3 and t4 when the input voltage is at negative half line cycle. No positive current can be allowed to flow out of V_in_ac.

The input line current waveform is also shown in FIG. 3. As shown by FIG. 3, only positive current flows out of V_in_ac during a positive cycle, and only negative current flows out of V_in_ac during a negative line cycle. The zero-cross time when the line current appears is very close to the zero-cross time of input voltage (i.e., at times t1 and t3).

Thus, effectively with the help of the switches Q1 and Q2, the phase angle between the line current and the line voltage are forced to be very close to 0, or Ø≈0. As a result, cos Ø is eliminated from Equation (2), since cos(0)=1. Equation (2) now can be simplified as Equation (3):

$$PF = \frac{I_{1,rms}}{I_{rms}} \qquad \text{Equation 3}$$

When Equations 2 and 3 are compared to one another, Equation 3 may provide a much better power factor.

The conduction period of the switches Q1 and Q2 between times t1 and t2, and t3 and t4, can be easily controlled by adjusting the resistors R3 and R4. The larger the resistance values of the resistors R3 and R4, the greater the conduction period of the switches Q1 and Q2 and, as result, the LED current is increased.

Figure 4:
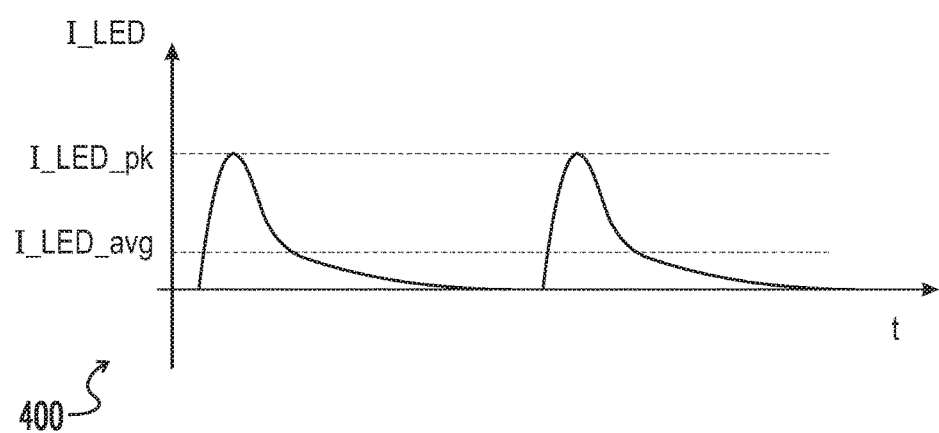
FIG. 4 illustrates an exemplary LED load current waveform according to aspects of the present disclosure.

FIG. 4 illustrates an exemplary LED load current waveform according to aspects of the present disclosure. LED current may have the same waveform as the input line current except that negative current of the input line will be rectified to positive by the bridge rectifier BR and the switches Q1 and Q2.

The peak LED current can be defined as:

$$I\_led\_pk = C_{I\_limit} \times \frac{dV_{in\_ac}}{dt} = C_{I\_limit} \times 2 \times \pi \times f_{line} \times V_{in\_ac\_pk} \times \cos(\alpha) \qquad \text{Equation 4}$$

The f_line in Equation 4 is the line frequency. The voltage V_in_ac_pk is the peak voltage of the input voltage V_in_ac. α is the conduction time. If α=0, then cos(α)=1. The peak and average LED current is thus maximized.

By properly setting resistance values of the resistors R3 and R4, the conduction time α may be modified to control the peak and average LED output current. Thus, by properly controlling the switches Q1 and Q2, a simple LED driver with medium power factor (i.e. 0.5) may be provided with only a capacitor and a bridge rectifier having four input rectifier diodes. The switches Q1 and Q2 are put in series with the rectifying diodes of the bridge rectifier.

By controlling the switches Q1 and Q2, only positive current can be configured to flow out of the AC input voltage source V_in_ac during a positive line cycle. Similarly, only negative current can be configured to flow out of the AC input voltage source V_in_ac during a negative line cycle.

By forcing only positive line current flow out of the AC input voltage source V_in_ac during a positive line cycle and only negative line current flow out of the AC input voltage source V_in_ac during a negative line cycle, the phase angle difference between line current and line voltage can be minimized. By minimizing the phase angle between line current and voltage the power factor can be improved dramatically. The peak LED current, as well as the average LED current, can be controlled by changing the conducting time of the switches Q1 and Q2 as described herein.

To facilitate the understanding of the embodiments described herein, a number of terms are defined below. The terms defined herein have meanings as commonly understood by a person of ordinary skill in the areas relevant to the present invention.

Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims. The phrase "in one embodiment," as used herein does not necessarily refer to the same embodiment, although it may.

The term "circuit" means at least either a single component or a multiplicity of components, either active and/or passive, that are coupled together to provide a desired function. Terms such as "wire," "wiring," "line," "signal," "conductor," and "bus" may be used to refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. An alternating current (AC) light emitting diode (LED) driver for providing operating power to an LED load, comprising:
   a first input terminal and a second input terminal, each of the first and second input terminals connectable to an AC input voltage source;
   a current limiting capacitor coupled to the first input terminal;
   a bridge rectifier coupled to the current limiting capacitor, the bridge rectifier having a plurality of rectifying diodes and configured to rectify an input from the AC input voltage source;
   a phase angle shift unit coupled to the first input terminal and the bridge rectifier, the phase angle shift unit configured to minimize a phase angle between input line current and input voltage received via at least one of the first input terminal and the second input terminal and rectified by the bridge rectifier.

2. The driver of claim 1, wherein the phase angle shift unit includes a first switch and a second switch, each of the first switch and the second switch placed in series with at least one of the plurality of rectifying diodes.

3. The driver of claim 2, wherein the first switch and the second switch are configured to operate such that only positive current flows from the AC input voltage source during a positive line cycle and that only negative current flows from the AC input voltage source during a negative line cycle.

4. The driver of claim 2, wherein the first switch and the second switch are configured to minimize a phase angle difference between an input line current and an input line voltage received from the AC input voltage source.

5. The driver of claim 2, wherein a peak LED load current is controlled by a conducting time of at least one of the first switch and the second switch.

6. The driver of claim 5, wherein the conducting time is determined, at least in part, according to a resistance value associated with at least one of:
   a first timing resistor coupled across a gate and a source of the first switch; and
   a second timing resistor coupled across a gate and a source of the second switch.

7. The driver of claim 6, wherein the first timing resistor is coupled in parallel with a first Zener diode across the gate and the source of the first switch, and wherein the second timing resistor is coupled in parallel with a second Zener diode across the gate and the source of the second switch.

8. The driver of claim 7, further comprising:
   a first gate charging resistor and a second gate charging resistor, each of the first and second gate charging resistors coupled to the first input terminal, wherein
   the first gate charging resistor is coupled to an anode of the first Zener diode, and the second gate charging resistor is coupled to a cathode of the second Zener diode.

9. The driver of claim 1, further comprising:
   a current bypass capacitor coupled to an output terminal of the current limiting capacitor and to the second input terminal.

10. The driver of claim 1, further comprising:
    a buffer capacitor having first and second output terminals, the buffer capacitor configured to buffer output to a load coupled to the first and second output terminals.

11. The driver of claim 10, wherein the load is an LED light string.

12. A method of providing an alternating current (AC) light emitting diode (LED) driver having improved power function, the method comprising:
    receiving an AC input voltage and current from an AC input voltage source;
    limiting the received AC input current using a current limiting capacitor;
    rectifying the limited received AC input current to form a rectified input;
    providing the rectified input to a phase angle shift unit;
    shifting a phase angle of at least one of an input voltage and an input current of the rectified input using a first switch and a second switch to form a shifted load output; and
    providing the shifted load output to a load coupled to the AC LED driver.

13. The method of claim 12, wherein the shifting the phase angle comprises:
    controlling the first switch and the second switch to operate such that only positive current flows from the AC input voltage source during a positive line cycle and only negative current flows from the AC input voltage source during a negative line cycle.

14. The method of claim 12, further comprising:
    controlling a peak load current according to a conducting time of at least one of the first switch and the second switch.

15. The method of claim 14, further comprising:
determining the conducting time, at least in part, according to a resistance value associated with at least one of:
- a first timing resistor coupled across a gate and a source of the first switch; and
- a second timing resistor coupled across a gate and a source of the second switch.

16. An alternating current (AC) light emitting diode (LED) driver for providing operating power to an LED load, comprising:
- a first input terminal and a second input terminal, each of the first and second input terminals connectable to an AC input voltage source;
- a current limiting capacitor coupled to the first input terminal;
- a bridge rectifier coupled to the current limiting capacitor, the bridge rectifier having a plurality of rectifying diodes;
- a first gate charging resistor and a second gate charging resistor, each of the first and second gate charging resistors coupled to the first input terminal;
- a first switch coupled to an anode of a first of the plurality of rectifying diodes at a drain thereof;
- a second switch coupled to a cathode of a second of the plurality of rectifying diodes at a drain thereof;
- a first Zener diode having an anode coupled to the first gate charging resistor and being coupled between a gate and a source of the first switch;
- a second Zener diode having a cathode coupled to the second gate charging resistor and being coupled between a gate and a source of the second switch;
- a first timing resistor coupled in parallel with the first Zener diode across the gate and the source of the first switch; and
- a second timing resistor coupled in parallel with the second Zener diode across the gate and the source of the second switch.

17. The driver of claim 16, wherein the first and second timing resistors are respectively configured to set a conducting time and to discharge a gate to source parasitic capacitance of the first switch and the second switch.

18. The driver of claim 16, wherein the first switch and the second switch are configured to minimize a phase angle difference between an input line current and an input line voltage received from the AC input voltage source.

19. The driver of claim 16, wherein a peak LED load current is controlled by a conducting time of at least one of the first switch and the second switch.

20. The driver of claim 19, wherein the conducting time is determined, at least in part, according to a resistance value associated with at least one of:
- a first timing resistor coupled across the gate and the source of the first switch; and
- a second timing resistor coupled across the gate and the source of the second switch.

* * * * *